Nov. 15, 1932.  E. L. FIX ET AL  1,887,550
PROCESS FOR MAKING COMPOSITE GLASS
Filed March 7, 1930
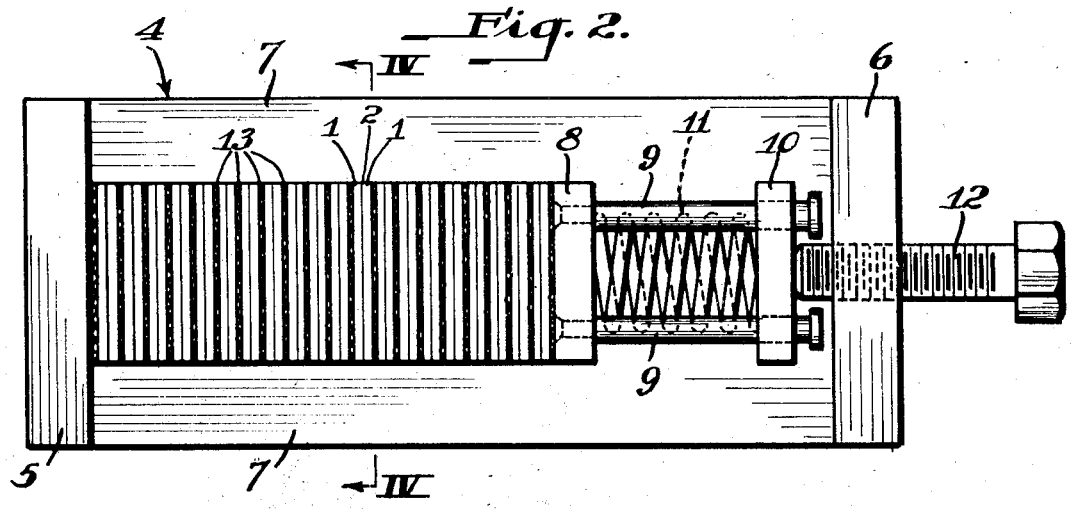
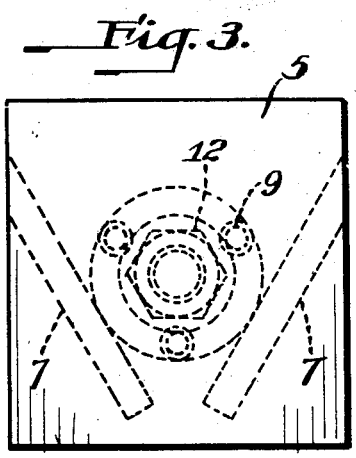
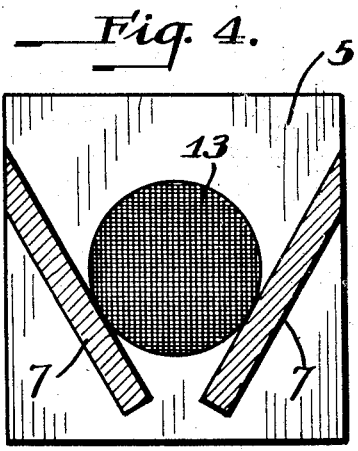
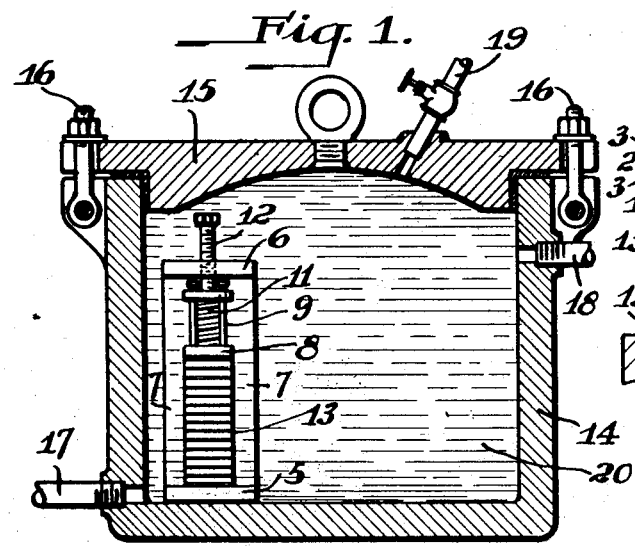
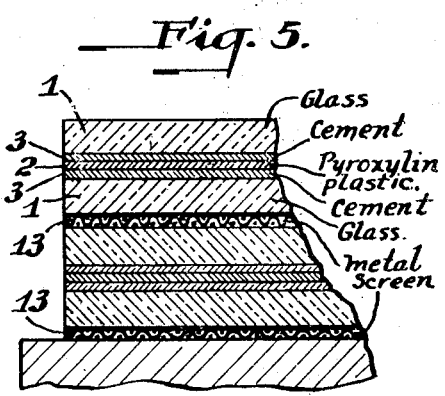
INVENTORS
Earl L. Fix
Maurice L. Macht
by
James C. Bradley
atty Patented Nov. 15, 1932

1,887,550

UNITED STATES PATENT OFFICE

EARL L. FIX AND MAURICE L. MACHT, OF NEW KENSINGTON, PENNSYLVANIA, ASSIGNORS TO DUPLATE CORPORATION, A CORPORATION OF DELAWARE

PROCESS FOR MAKING COMPOSITE GLASS

Application filed March 7, 1930. Serial No. 433,945.

The invention relates to a process and apparatus for making composite glass plates consisting of glass sheets reinforced by sheets of reinforcing material, preferably pyroxylin plastic, such as celluloid. The invention is illustrated as applied to the compositing of relatively small plates, such as goggle lenses, and is particularly useful in such work, but is not limited to the manufacture of small size plates and may be employed to advantage in manufacturing plates of any size. The invention has for one of its principal objects the provision of a process and apparatus which will composite a large number of plates at one time and with a minimum of labor. A further object is the provision of a process and apparatus which will produce a superior product, in that the plates are entirely free from the edge strain characteristic of blanks composited by the well-known rubber bag process and which require no edge sealing in order to prevent edge separations. One embodiment of the apparatus used in practicing the process is shown in the accompanying drawing, wherein:

Figure 1 is a vertical section through the complete apparatus as assembled for the final compositing operation. Fig. 2 is a plan view of the rack and apparatus for performing the preliminary pressing operation. Fig. 3 is an end view of the rack shown in Fig. 2. Fig. 4 is a section on the line IV—IV of Fig. 2. And Fig. 5 is a section on an enlarged scale through one set of sheets which are laminated to form goggle discs.

In practicing the invention, a large number of sets of sheets or discs are laminated at one time and the arrangement of each set of discs is shown in Fig. 5, 1, 1 being sheets of glass, 2 a sheet of pyroxylin plastic, such as celluloid or other suitable reinforcing, and 3, 3 layers of cement, such as gelatin which are dried on the sheets of glass before the assembling. It will be understood, however, that the term "cement" is used in its broad sense and applies to any adhesive used between the celluloid and the glass and even to a cement formed by softening the surface of the celluloid by a plasticizer, such as acetone or any other suitable solvent.

The rack 4 comprises a pair of end plates 5 and 6 rigidly secured together by means of the bars 7, 7, inclined, as indicated in Figs. 3 and 4, the bars preferably being welded to the plates at their ends. Mounted for longitudinal movement in the trough toward and from the plate 5 is the presser plate 8 provided with three guide rods 9, 9, 9 upon which is mounted slidably a plate 10. Between the plates 8 and 10 is a heavy spring 11 which may be placed under compression by the screw 12 threaded through the plate 6.

In order to perform the preliminary pressing operation, a series of sets of plates are stacked between the bars 7, 7, as indicated in Fig. 2, sheets of copper gauze 13 being placed between the various sets and also between the end sets and the plates 5 and 8. These gauze plates serve to cushion the glass plates and tend to reduce breakage. They perform a still more important function in that they permit liquid to penetrate between the sets of plates during the subsequent hydraulic pressing operation, so that the stack of plates is heated much more quickly and uniformly than if the gauze plates were not used. After the plates are stacked, as indicated in Fig. 2, the screw 12 is operated to move the plate 10 downward and compress the spring 11, thus applying yielding pressure to the sets of plates. This pressure is preferably in the neighborhood of 60 pounds per square inch upon the glass sheets, but may be greater or less depending upon conditions. Such pressure is sufficient to press the edges of the sheets being laminated tightly together so that subsequently in the hydraulic pressing operation, no liquid can be forced between the edges of the sheets.

After the plates in the rack have been placed under compression, as above described, the rack is placed in the pressure chamber 14, as indicated in Fig. 1. This comprises a body portion having a lid 15 which is clamped in position by means of the bolts 16. A pair of pipes 17 and 18 lead to a heat exchanger so that the temperature of the liquid which is supplied to the chamber may be kept at any desired point. The lid 15 is also provided with an exhaust connection 19.

Only one rack is shown in the pressure chamber, but in practice the chamber is filled with racks for the hydraulic pressing operation. The liquid preferably employed in the pressure chamber is diethylene glycol, carbitol, dibutyl phthalate, or some other pyroxylin plastic solvent or plasticizer having a high boiling point, although other liquids may be used, such as water, paraffin, glycerine or castor oil.

In the preferred practice of the operation, the rack containing the plates under compression is placed in the liquid 20 having a temperature of 200 degrees F. or somewhat more, the lid 15 is applied and the pressure in the tank is brought up to about 150 pounds per square inch by means of a pump connected to the line of connections including the pipes 17 and 18. The temperature as thus applied by the liquid is sufficient to soften the celluloid slightly and also the cement and the pressure applied by the liquid is sufficient to laminate the sheets making up the various sets. The preliminary pressure on the sheets applied by the spring 11 seals the sheets together at their edges, so that when the fluid pressure of 150 pounds per square inch is applied to such edges, it cannot penetrate between the sheets. The full pressure of 150 pounds is, however, applied against the faces of the sheets since such pressure is applied to the upper face of the plate 8 and to the spaces between the sheets which are only partially filled by the sheets of wire screen 13. This completes the pressing operation, after which the lid is removed, the rack is taken out, and the composited plates are removed from the racks.

With plates of small size, such as goggle lenses, it is unnecessary to exhaust the air in the chamber 19 preliminary to the fluid pressing operation, but with larger plates, to which the process is readily applicable, it is desirable in order to remove any air from beween the sheets to exhaust the air in the chamber 19 preliminary to the fluid pressing operation. In following this procedure, the rack 4 is placed in the chamber 14 with no liquid in such chamber, the lid is applied and the air is exhausted by means of the connection 19. The chamber is then filled with the heated liquid and the pressing operation carried on as heretofore described.

The plates 13 are preferably of copper gauze, as such material can be used indefinitely and permits a very free circulation of the heated liquid or other fluid between the sets of plates, but sheets of other material may be used, such as blotting paper, heavy cloth or sheets of metal suitably perforated to permit the liquid to pentrate between the sets. Further with small discs it is possible to operate successfully without any packing or separating means between the sets of sheets.

What we claim is:

1. A method of making composite articles which comprises superposing sheets of glass and a reinforcing material adapted to be adhesively united, applying a mechanical pressure to the article with its edges exposed, submerging the article in a liquid and applying heat and pressure to the liquid while maintaining the mechanical pressure.

2. A method of making composite articles which comprises superposing sheets of glass and a reinforcing material adapted to be adhesively united, assembling a plurality of the composite articles thus provided in superposed relation, interposing a porous yieldable material between the superposed articles, applying a mechanical pressure to the articles with the edges of the articles exposed, submerging the superposed articles in a liquid, and applying heat and pressure to the liquid while maintaining the mechanical pressure.

3. A method of making composite articles which comprises superposing glass and a reinforcing material adapted to be adhesively united, assembling a plurality of composite articles thus provided in superposed relation, clamping the articles with their edges exposed by applying sufficient pressure firmly to engage the elements of each article, submerging the superposed articles in a liquid and applying heat and pressure to the liquid while maintaining the pressure first applied, the second applied pressure being substantially greater than the first.

4. A method of making composite articles which comprises superposing glass and a reinforcing material adapted to be adhesively united, assembling a plurality of composite articles thus provided in superposed relation, interposing a porous yieldable material beween the articles, clamping the articles with their edges exposed by applying sufficient pressure firmly to engage the elements of each article, submerging the superposed articles in a liquid and applying heat and pressure to the liquid while maintaining the pressure first applied, the second applied pressure being substantially greater than the first.

5. A method of making composite articles which comprises superposing glass and a reinforcing material adapted to be adhesively united, assembling a plurality of composite articles thus provided in superposed relation, clamping the articles with their edges exposed by applying sufficient pressure to seal the edges of each article against fluid penetration, submerging the articles in a heated liquid and applying pressure to the liquid to form unitary articles while maintaining the pressure first applied.

In testimony whereof, we have hereunto subscribed our names.

EARL L. FIX.
MAURICE L. MACHT.